(No Model.)

F. SHUMAN.
MACHINE FOR EMBEDDING WIRE IN GLASS.

No. 561,920. Patented June 9, 1896.

Witnesses:
Murray C. Boyer
R. Schleicher

Inventor:
Frank Shuman
by his Attorneys
Howson & Howson

UNITED STATES PATENT OFFICE.

FRANK SHUMAN, OF PHILADELPHIA, PENNSYLVANIA, ASSIGNOR TO THE WIRE GLASS COMPANY, OF SAME PLACE.

MACHINE FOR EMBEDDING WIRE IN GLASS.

SPECIFICATION forming part of Letters Patent No. 561,920, dated June 9, 1896.

Application filed November 14, 1892. Serial No. 451,870. (No model.)

*To all whom it may concern:*

Be it known that I, FRANK SHUMAN, a citizen of the United States, residing in Philadelphia, Pennsylvania, have invented certain Improvements in Machines for Embedding Wire in Glass, of which the following is a specification.

The object of my invention is to construct a machine for manufacturing wire-embedded glass.

My improved machine is constructed to embed the wire in the glass, as fully set forth in the process patent granted to me on the 20th day of September, 1892.

Figure 1:
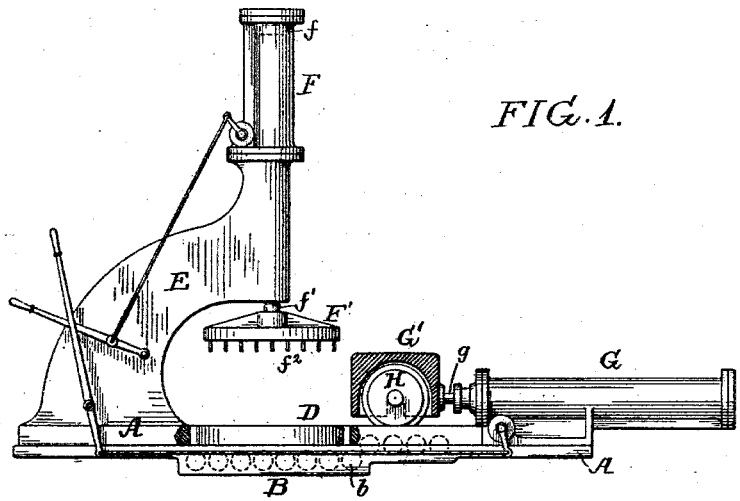
Figure 2:
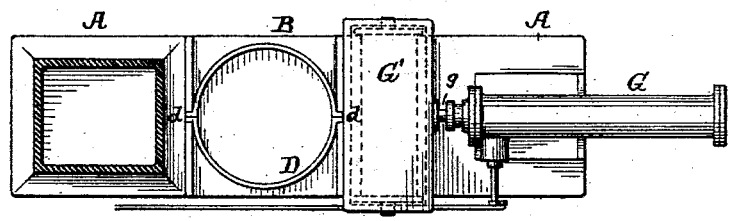
Figure 3:
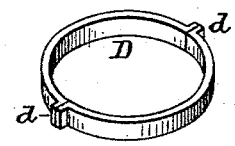
Figure 4:
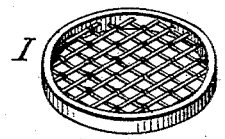
Figure 5:
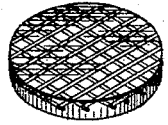

In the accompanying drawings, Figure 1 is a side view, partly in section, illustrating my improved machine for embedding wire in glass. Fig. 2 is a sectional plan view. Fig. 3 is a perspective view of the frame or holder for the glass. Fig. 4 is a perspective view of the frame or holder for the wire-netting prior to its being inserted in the glass, and Fig. 5 is a view of the finished article.

A is the base of the machine, having a platen or table B, which is preferably heated to the degree required either by gas passing through the tubes $b$, as shown clearly in Fig. 1, or by a furnace under the table, as described in my former patent. Upon this platen is mounted a frame D, which is made in two parts, each part having lugs $d$, which are adapted to recesses in the table, as shown in Fig. 2, so that when the two parts are in position they are locked together and form a receptacle or mold for the glass when it is poured from the ladle. Mounted directly above this frame on a standard E is a cylinder F, having a piston $f$ and piston-rod $f'$. On the lower end of the piston-rod is a plate or head F', having projections $f^2$ of sufficient depth to penetrate the glass and so shaped as to engage the wire and force it into the glass. These projections may be in the form of ribs or lugs so shaped that they will not pass through the meshes of the wire. The cylinder is preferably a hydraulic cylinder and has suitable inlets and outlets provided with valves, so that by manipulating said valves the plate F' can be raised or lowered, as desired.

Mounted on the base A is a cylinder G, preferably a hydraulic cylinder, having passages and valves similar to the cylinder F, and attached to the piston-rod $g$ of this cylinder is a carriage G', having a roller H, which is so situated in respect to the frame D that on the forward movement of the carriage the roller will travel over the frame, rolling out the glass that has been poured therein, so that the glass will properly fill the frame, after which it is returned to its normal position.

I is a frame or holder for the wire to be inserted in the glass. This frame or holder may be dispensed with in some instances; but I prefer to use it, as it will insure the proper alinement of the wire with the frame D. This frame or holder I is placed over the glass-frame D after the glass has been poured therein and rolled, and when the plate or head F moves down it passes into the holder I, forcing the wire therefrom and embedding it in the glass to the depth required. The plate or head F is then raised to its normal position, and the frame or holder for the wire is removed, after which the roller H is again passed over the glass, closing the openings made by the wire and the projections on the head or plate F, thus completely embedding the wire in the glass.

In some instances the glass may be poured into the frame D and the wire forced into it without previously rolling the glass, although I preferably roll the glass before the wire is inserted therein.

I have shown hydraulic mechanism for moving the rolling and pressing apparatus. Other means common to the art may be used without departing from my invention.

I claim as my invention—

1. The combination in a machine for embedding wire in glass, of the bed, the frame for the glass, a plate mounted directly above the frame, said plate having projections, a piston, a piston-rod connected to the plate, a cylinder, a supporting-frame therefor, a roller adapted to reciprocate over the glass and press the same, its piston-rod connected to the roller, and a cylinder, the whole being combined substantially as and for the purpose set forth.

2. The combination in a machine for embedding wire in glass, of a bed-plate, a frame for receiving the glass, with a wire-holding frame mounted above the glass-frame, a plate, projections on said plate, means for vertically moving the said plate so as to force the wire from the wire-frame into the glass, with a roller and means for reciprocating said roll over the glass, substantially as described.

3. The combination in a machine for embedding wire in glass, of the bed-plate, heating-tubes therein, a detachable glass-frame mounted on said plate, a cylinder, piston and piston-rod, a plate carried by said piston-rod, projections on said plate, with a horizontal cylinder mounted on the bed-plate, a piston and piston-rod, a carriage and a roller, said roller being adapted to move over the glass-frame, substantially as described.

In testimony whereof I have signed my name to this specification in the presence of two subscribing witnesses.

FRANK SHUMAN.

Witnesses:
H. F. REARDON,
HENRY HOWSON.